S. Richards,
Glass Furnace.
N° 15,389. Patented July 22, 1856.
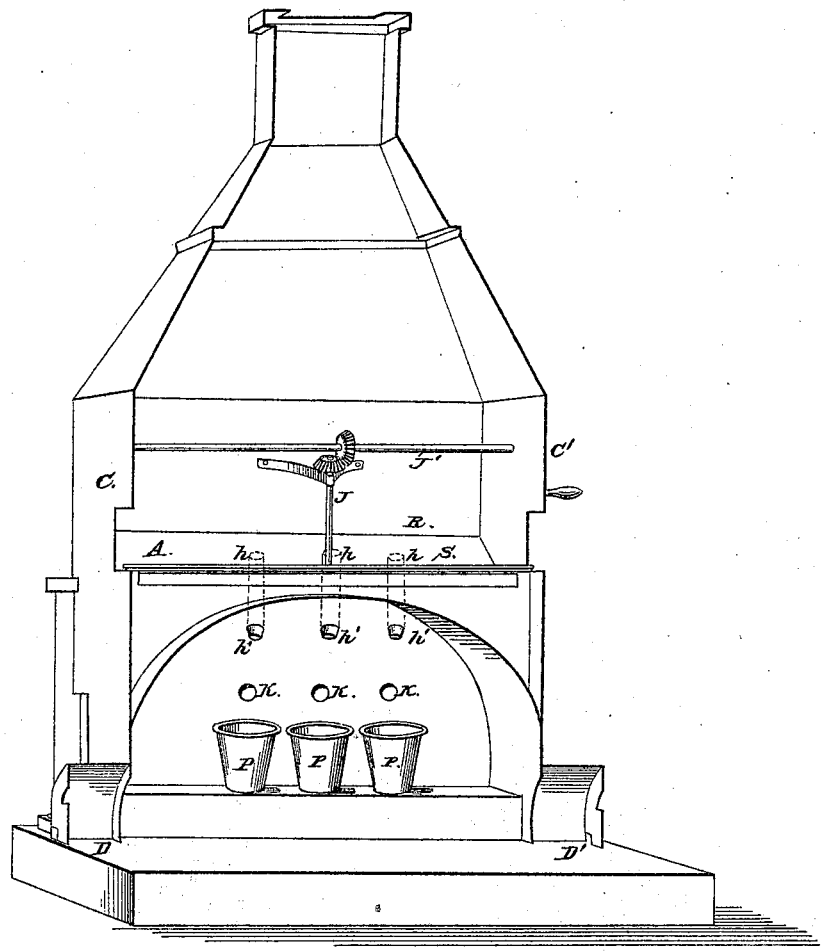

UNITED STATES PATENT OFFICE.

SAML. RICHARDS, OF PHILADELPHIA, PENNSYLVANIA.

GLASS-FURNACE.

Specification of Letters Patent No. 15,389, dated July 22, 1856.

*To all whom it may concern:*

Be it known that I, SAMUEL RICHARDS, of the city of Philadelphia and State of Pennsylvania, have invented a new and useful Improvement in the Construction of Glass-Furnaces, and that the following is a full and exact description of the same, reference being had to the annexed drawings, making a part of this specification, in which is shown a perspective view of the interior of one side of a glass-furnace with my improvement.

In my patent of June 3, 1856, I described a mode of constructing and arranging shelves within the cone of an ordinary glass furnace for the purpose of containing the batch or raw material in order to heat the same to a high temperature before it is introduced into the pots of the furnaces, thereby utilizing the otherwise waste heat which would escape at the top of the cone and preventing the breakage of pots and reducing the labor and time occupied in charging the pots or crucibles. I described therein two openings in the main outside front and rear walls of the furnace and I also described in detail two long shelves extended along the whole length of the furnace and supported by rods attached to the crown and sides of the furnace. A series of small holes were made in these shelves and in the side of the furnace through which the raw material could be drawn off and discharged into the ring holes of the furnaces through a movable exterior spout. The raw material was supplied to the shelves by means of a small car running on rails with movable sides opening so as to discharge the batch on to the shelves. The advantages of that arrangement were described as heating the batch up to a high point while on the shelves and preparatory to its being charged into the pots—the utilizing a large portion of otherwise wasted heat of the furnace and a great saving in the time and labor of charging the pots of the furnace.

My present invention consists in an improvement on the arrangement described in that patent for discharging the batch into the pots from the shelves—the mode of constructing the furnace in all other respects and the mode of passing the batch on to the shelves by means of a small railroad car is the same as is described in the specification of that patent.

C C' D D' represents the side of a glass furnace cut open and shown on the inside.

R, S, represents a trough or shelf shaped and supported in the same manner as described and fully shown in my patent of June 3, 1856.

P, P, P are a series of pots, placed on the benches.

K K K are the ring holes as in ordinary glass furnaces.

I make a series of apertures or holes at $h$, $h$, $h$, in the bottom of the shelves R, S, each aperture being vertically above the center of a corresponding pot in the furnace. A series of clay tubes, pipes or passages $h\ h'\ h\ h'\ h\ h'$ circular or rectangular in section is constructed in the crown of the furnace leading directly from the series of apertures $h\ h\ h$ down to the interior of the furnace above the centers of the pots. In an ordinary glass furnace the tubes or passages should be about 9 inches long and about 1 inch in diameter if circular in section; or if rectangular about ¼ of an inch by about 8 inches would be good dimensions. The pulverized batch is constantly flowing slowly down through these tubes $h\ h'$ and at $h'\ h'\ h'$ the pulverized batch is slowly discharged or suffered to trickle and fall into the pots. The distance of the point $h'$ from the pots and the narrow section of discharge of the tube $h\ h'$ cause the batch to be exposed for a considerable time to the intense heat of the crown and upper part of the glass furnace and thus the batch is melted or nearly melted by the time it reaches the pot. From the point $h'$ to the pot below is from 4 to 8 feet and the fine stream of batch or semi-molten material is exposed during that distance directly to the most intense heat of the glass furnace.

In order to keep up a constant flow or passage of the pulverized batch into and along the tubes $h\ h'$, &c., I introduce a series of agitators one of which is shown at J. These agitators may be revolved constantly by cog wheels as shown in the drawing or they may be agitated by a properly arranged vibrating apparatus. The tubes $h\ h$ are to be closed except when the material is to be charged down by means of small metallic valves or stoppers.

The operation of my improvement is as follows: The batch is introduced into the shelves R S by means of a small rail car as shown in my former patent. Here the batch remains exposed to the intense heat of the furnace for 24 hours or longer if necessary. Whenever it is desired to charge the pots, the valves at the top of the tubes $h$ $h'$ are opened and the pulverized mass is suffered to pass or flow slowly through $h$ $h'$ and to fall down through the intensely heated upper part of the furnace into the pots. By this arrangement the economy attendant on utilizing the waste heat of the furnace while the batch is on the shelves is attained as in my former patent and also the economy and despatch in charging the material into the pot. But in addition to these advantages I obtain by means of the interior narrow tubes or passages $h$ $h'$ arranged and operating as above described the advantage of exposing the batch in attenuated streams to the continuing action of the heat in its passage from the shelves and the tubes $h$ $h'$ through the highly heated upper part of the furnace. The employment of the series of interior tubes of small transverse section as above described I have found by experiment to reduce the time and cost of melting the batch from 30 to 60 per cent. over my former plan of exterior tubes of communication between the shelves and pots.

Having thus described my invention what I desire to claim as an improvement over my former patented improvement of June 3, 1856, is—

1. The employment of a series of interior tubes $h$ $h'$ $h$ $h'$ arranged and operating as hereinbefore described.

2. The employment in connection with said tubes $h$ $h'$ &c. of vibrating or rotating agitators J, J.

SAMUEL RICHARDS.

Witnesses:
I. E. SHAW,
JNO. B. KENNY.